(12) United States Patent
Swinderman

(10) Patent No.: US 7,216,756 B2
(45) Date of Patent: May 15, 2007

(54) CONSTANT ANGLE AND PRESSURE CONVEYOR BELT CLEANER AND TENSIONER

(75) Inventor: Robert Todd Swinderman, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 10/996,843

(22) Filed: Nov. 24, 2004

(65) Prior Publication Data

US 2006/0108201 A1     May 25, 2006

(51) Int. Cl.
*B65G 45/16* (2006.01)
(52) U.S. Cl. ..................................................... 198/499
(58) Field of Classification Search ................ 198/499, 198/498
See application file for complete search history.

(56) References Cited

U.S. PATENT DOCUMENTS

| | | | |
|---|---|---|---|
| 4,098,394 A * | 7/1978 | Stahura | 198/499 |
| 4,249,650 A * | 2/1981 | Stahura | 198/499 |
| 4,768,644 A * | 9/1988 | Cromm | 198/499 |
| 5,301,797 A | 4/1994 | Holyfield, Jr. | |
| 5,378,202 A | 1/1995 | Swinderman | |
| 5,385,507 A | 1/1995 | Swearingen | |
| 6,179,114 B1 | 1/2001 | Brink | |
| 6,283,274 B1 * | 9/2001 | Dolan et al. | 198/499 |
| 6,321,901 B1 * | 11/2001 | Strebel et al. | 198/499 |
| 6,360,875 B1 * | 3/2002 | Altemus et al. | 198/499 |
| 6,374,991 B1 | 4/2002 | Swinderman | |
| 6,439,373 B1 * | 8/2002 | Swinderman | 198/499 |
| 6,443,294 B1 | 9/2002 | Brody | |

* cited by examiner

*Primary Examiner*—Mark A. Deuble
(74) *Attorney, Agent, or Firm*—Patzik, Frank & Samotny Ltd

(57) ABSTRACT

A tensioner for maintaining engagement of a conveyor belt cleaner, including one or more scraper blades mounted on a rotatable support frame, with a conveyor belt. The tensioner includes a mounting member attached to the support frame for conjoint rotation therewith, a biasing member attached to the mounting member, and an actuator attached to the biasing member. Operation of the actuator stores a biasing force within the biasing member which in turn rotates the scraper blades into full-face engagement with the conveyor belt. As the scraper blades wear, the biasing member continues to rotate the blades into full-face engagement with the conveyor belt with a biasing force that changes in magnitude. The scraper blades include a blade face having an area which changes as the blades wear, in order to maintain a substantially constant contact pressure between the blades and the conveyor belt as the blades wear.

31 Claims, 13 Drawing Sheets

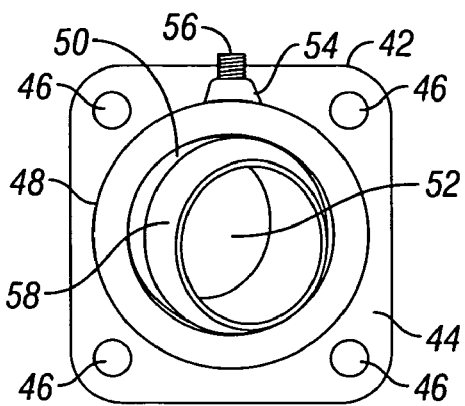
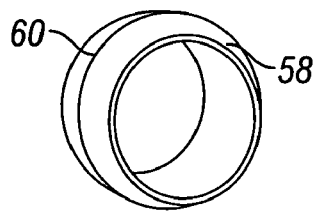
FIG. 7  FIG. 8
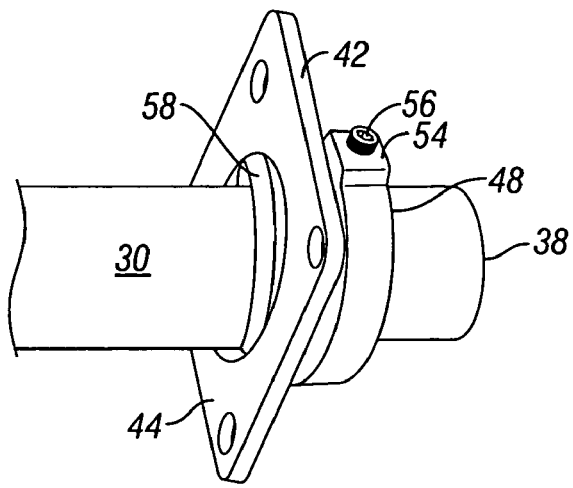
FIG. 9
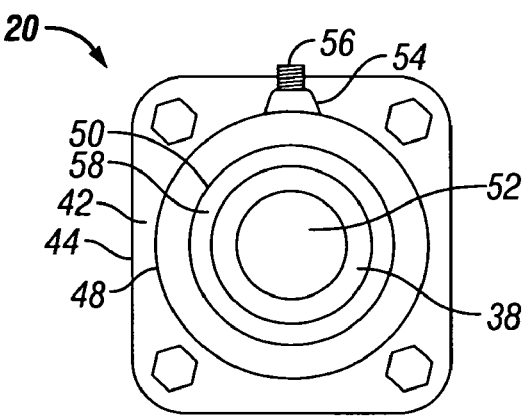
FIG. 10

CONSTANT ANGLE AND PRESSURE CONVEYOR BELT CLEANER AND TENSIONER

BACKGROUND OF INVENTION

The present invention relates to a conveyor belt cleaner and tensioning arrangement, and in particular to a conveyor belt cleaner and tensioning arrangement wherein the scraper blades of the conveyor belt cleaner have a blade face which provides initial and subsequent full-face contact with the conveyor belt and wherein the scraper blades maintain a substantially constant cleaning angle with the surface of the conveyor belt and engage the conveyor belt with a substantially constant scraping pressure during the wear life of the scraper blades.

Conveyor mechanisms utilize an endless conveyor belt to transport bulk material, such as sand, gravel, coal and other bulk materials, from one location to another. Such a conveyor utilizes a rotating drum at each end of the moving belt. As the bulk material is discharged from the moving conveyor belt, a portion of the bulk material often remains adhered to the outer surface of the conveyor belt. Conveyor belt cleaners, including one or more scraper blades, are used to scrape the adherent material from the belt on its return run and thereby clean the belt. The scraper blades of a conveyor belt cleaner are removably attached to a rotatable cross shaft that extends transversely across the width of the conveyor belt. A tensioning device is attached to the cross shaft and applies a rotational biasing force to the cross shaft which in turn rotates the tips of the scraper blades into scraping engagement with the conveyor belt.

Scraper blades made for contacting the belt on the curvature of the discharge pulley were previously made such that just the scraping edge of the blade face surface initially engaged the conveyor belt, rather than the entire or full blade face surface, when installed. This edge contact type of blade design cleans with high efficiency when new, but after the blade wears for a short period of time cleaning effectiveness is lost. Scraper blades that provide full-face contact between the face surface of the blade and the conveyor belt, such as those of the present invention, can be designed to maintain constant cleaning efficiency over their wear life. Full-face contact blades extend the life of the scraper blade, particularly on high speed conveyors because a full-face contact blade has more mass to absorb the heat of friction generated with the rotating belt. Full-face blades reduce a problem known as feathering which occurs with primary cleaner blades when just the scraping edge engages the belt.

The present invention also enables a scraper blade to operate with a substantially constant cleaning angle and scraping pressure. The tips of primary scraper blades engage the curved surface of the conveyor belt at the head pulley of the conveyor and form a cleaning angle between the conveyor belt surface and the front surface of the scraper blade at the scraping edge of the front surface. The tip of each scraper blade also includes a scraping surface that engages the surface of the conveyor belt. The scraping surface engages the surface of the conveyor belt with a scraping pressure that is approximately equal to the scraping force with which the scraper blade engages the conveyor belt divided by the area of the scraping surface of the scraper blade.

During operation, the scraping edge and the scraping surface of each scraper blade wears due to its scraping engagement with the moving conveyor belt coated with abrasive bulk solids. The tensioner rotates the cross shaft and the scraper blades to maintain the scraper blades in biased scraping engagement with the conveyor belt. As the scraper blades wear and are rotated into continuing engagement with the conveyor belt, the orientation of the scraper blades with respect to the conveyor belt changes, which typically causes a change in the cleaning angle between the surface of the conveyor belt and the front surface of the scraper blade at the scraping edge, and a change in the scraping pressure with which the scraper blade engages the conveyor belt. In order to maintain optimum cleaning of the surface of the conveyor belt, and to achieve maximum scraper blade life and performance, the cleaning angle between the scraper blades and the conveyor belt surface, and the scraping pressure with which the scraper blades engage the conveyor belt, should remain substantially constant during the wear life of the scraper blades as the scraper blades wear and are rotated into continuing engagement with the conveyor belt. One approach to partially solving this problem is shown in U.S. Pat. No. 4,917,231 owned by the applicant herein.

SUMMARY OF INVENTION

The present invention relates to a tensioner for a conveyor belt cleaner including a rotatable support frame having a central axis and a scraper blade attached to the support frame for cleaning a conveyor belt. The tensioner comprises a first mounting member adapted to receive a first end of the support frame and operatively attach the support frame to a stationery support, the first mounting member comprising a fixing element movable between a first position configured to enable the scraper blade to communicate with the conveyor belt and a second position configured to secure the blade assembly in a position rotated away from the conveyor belt. A second mounting member is adapted to be attached to the support frame for conjoint rotation with the support frame about the central axis. Additionally, an actuator operatively attached to the mounting member and configured to selectively apply a rotational biasing force to the mounting member and thereby rotate the support shaft and the scraper blade about the central axis.

In a preferred embodiment, the fixing element comprises a set screw and the first mounting member comprises a bearing bracket with a hub for receiving the first end of the support frame, wherein the hub comprises an aperture positioned transverse to the central axis for receiving the set screw. The set screw is configured to selectively engage the support frame to maintain the scraper blade in a first position in communication with the conveyor belt and to maintain the scraper blade in a second position rotated about the central axis, away from the conveyor belt.

The actuator comprises a locking nut and an adjustment nut mounted on a shaft operatively connected to the second mounting member. Alternatively, the actuator may comprise a turnbuckle operatively connected to the second mounting member, a toggle mechanism or other device commonly used for linear actuation.

The tensioner further comprises a resilient biasing member having a first end and a second end operatively connected to the actuator, the second end of the biasing member being movable with respect to the first end of the biasing member. As the actuator applies force to the biasing member, a biasing force is stored in the biasing member, the stored biasing force biasing the scraper blade into continuing engagement with the conveyor belt as the scraper blade wears without any additional force being applied to the biasing member by the actuator member. In a preferred embodiment of the present invention, the biasing member comprises a spring.

The second mounting member comprises a pulley. A connector comprises a first end operatively associated with the actuator, a second end operatively associated with the pulley, and central portion there between. The pulley comprises a socket adapted to releasably hold the second end of the connector and a peripheral groove adapted to releasably hold the central portion of the connector.

BRIEF DESCRIPTION OF DRAWINGS

FIG. 7 shows a front elevation view of a component of the conveyor belt cleaner and tensioner in accordance with a preferred embodiment of the present invention;

FIG. 8 shows a perspective view of a component of the conveyor belt cleaner and tensioner in accordance with a preferred embodiment of the present invention;

FIG. 9 shows a perspective view of assembled components of the conveyor belt cleaner and tensioner in accordance with a preferred embodiment of the present invention;

FIG. 10 shows a front elevation view of assembled components of the conveyor belt cleaner and tensioner in accordance with a preferred embodiment of the present invention;

DETAILED DESCRIPTION OF DRAWINGS

Figure 1:
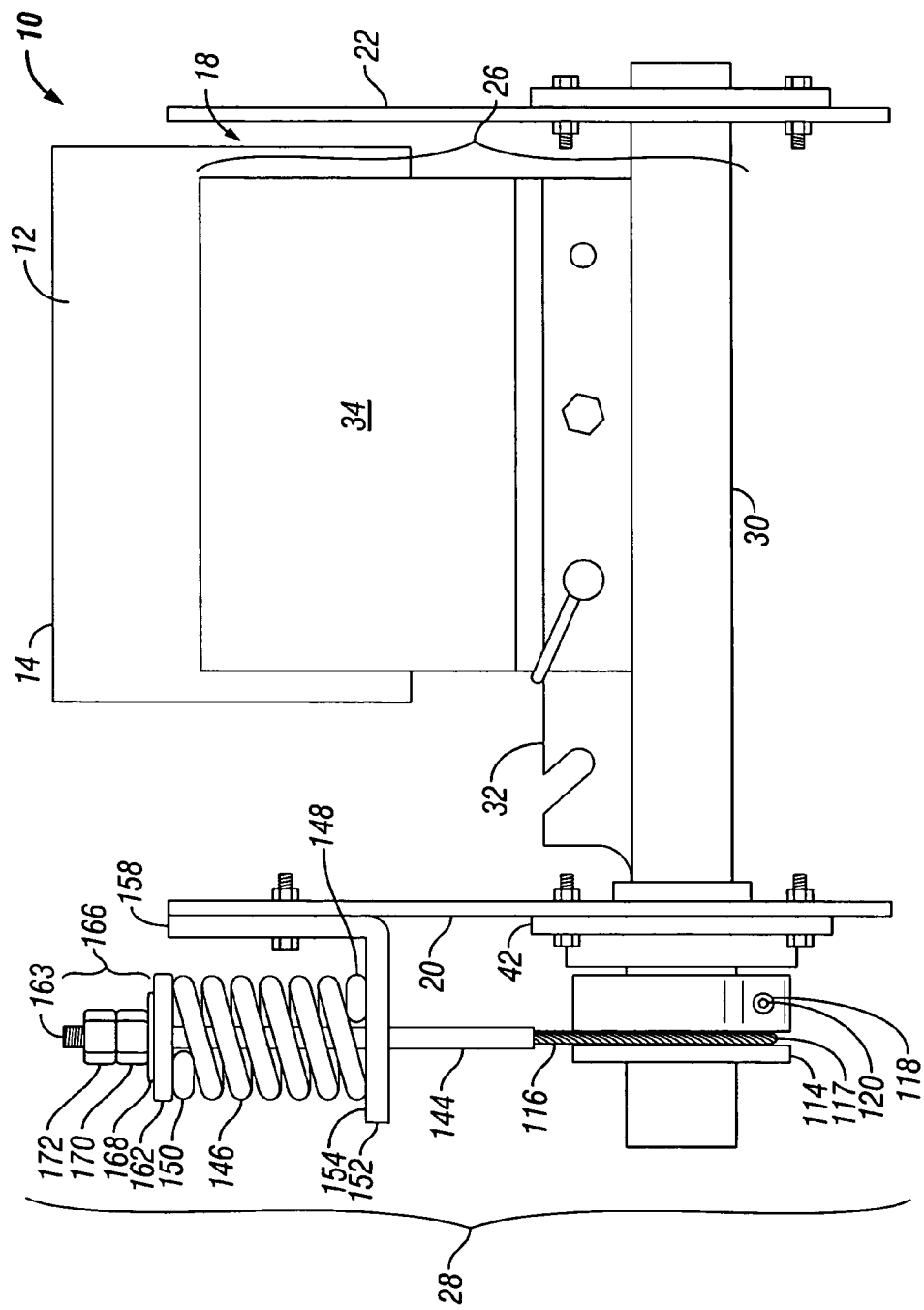
FIG. 1 shows a front elevation view of a conveyor belt cleaner and tensioner in accordance with a preferred embodiment of the present invention.
Figure 2:
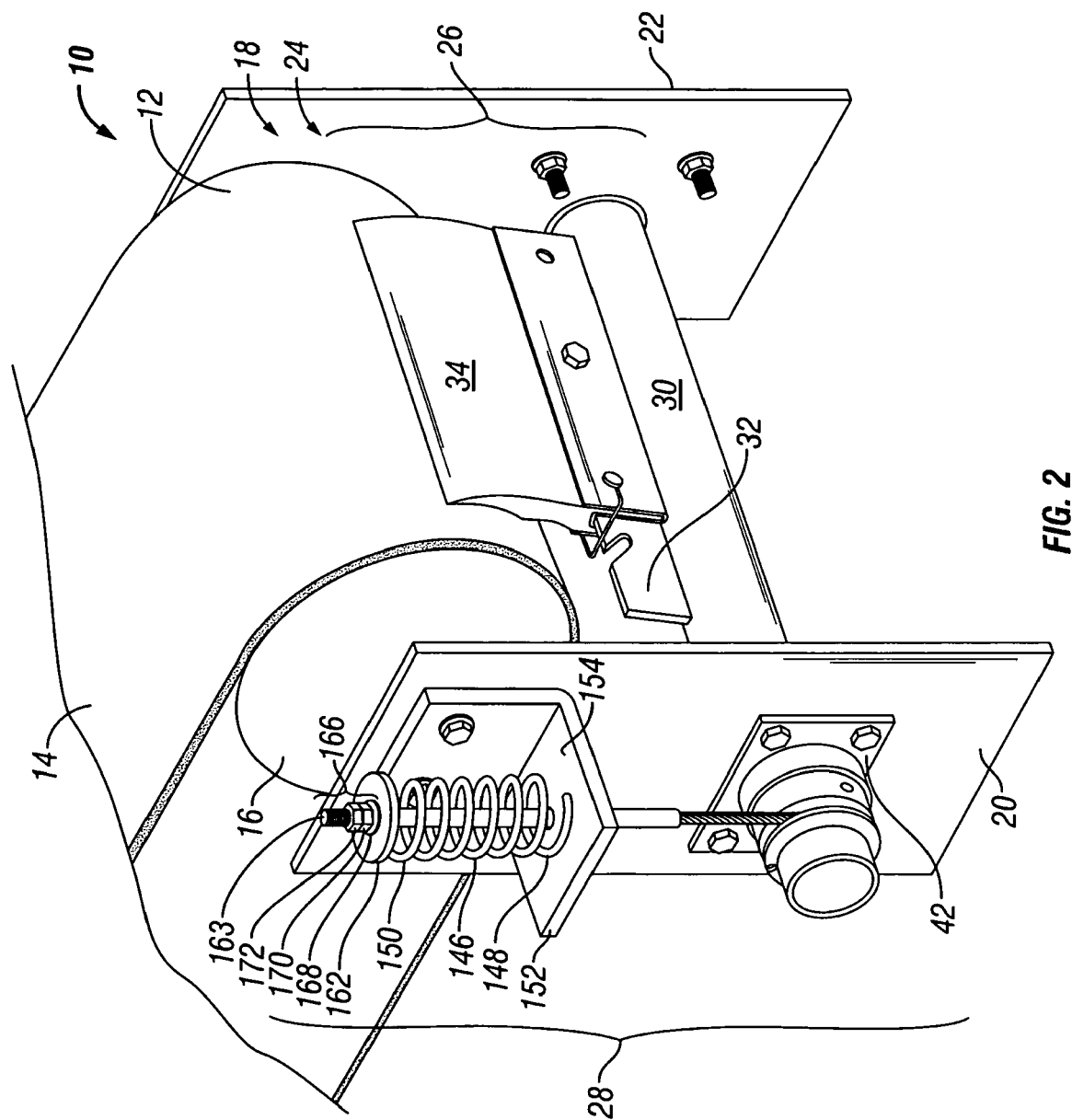
FIG. 2 shows a second perspective view of the conveyor belt cleaner and tensioner in accordance with a preferred embodiment of the present invention.

The conveyor belt cleaner and tensioner arrangement 10, as shown in FIGS. 1 and 2 is adapted for use in connection with a conveyor mechanism. The conveyor mechanism includes a rotatable endless conveyor belt 12 having an outer surface 14 that is adapted to transport bulk material. The bulk material is discharged from the conveyor belt 12 at a generally cylindrical head pulley 16 about which the conveyor belt 12 is partially wrapped. The rotatable head pulley 16 and the discharge end of the conveyor belt 12 may be located within a conveyor chute 18 or an open frame structure which forms part of the conveyor mechanism. The conveyor chute 18 includes a first chute wall 20 and a spaced apart and generally parallel second chute wall 22. The first and second chute walls 20, 22 form a chamber 24 located there between in which the head pulley 16 and discharge end of the conveyor belt 12 are located.

The conveyor belt cleaner and tensioner arrangement 10 includes a conveyor belt cleaner 26 and one or more conveyor belt cleaner tensioners 28. As shown in FIGS. 1 and 2, the conveyor belt cleaner and tensioner arrangement 10 includes a first conveyor belt cleaner tensioner 28. However, a second conveyor belt cleaner tensioner (not shown), constructed substantially identical to the first tensioner may also be utilized, either on the same side as the first tensioner or on the opposite side of the conveyor belt.

Figure 14:
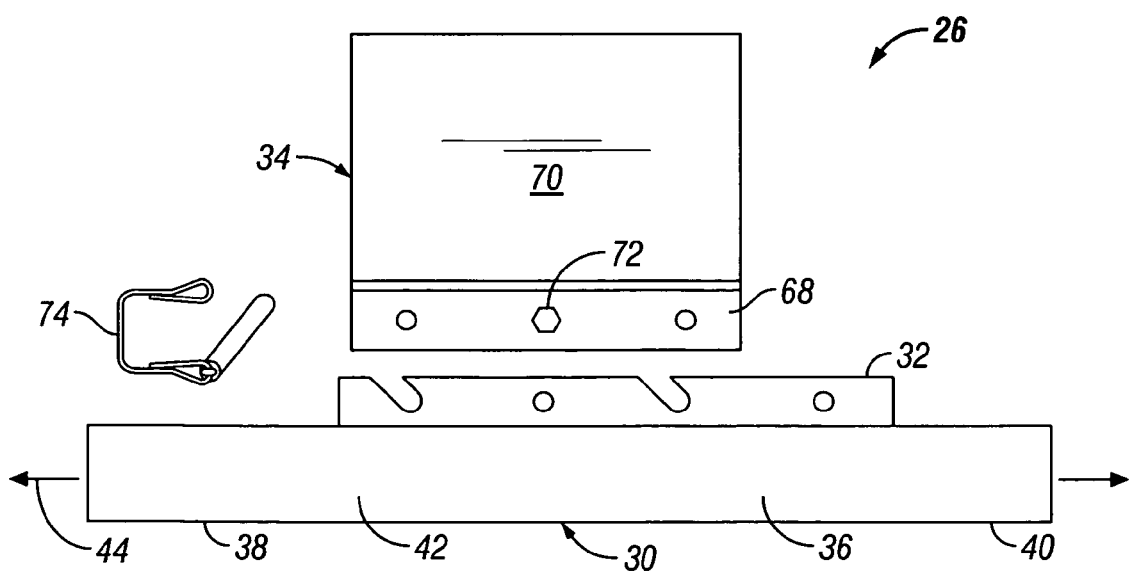
FIG. 14 shows an exploded view of a conveyor belt cleaner in accordance with a preferred embodiment of the present invention.
Figure 15:
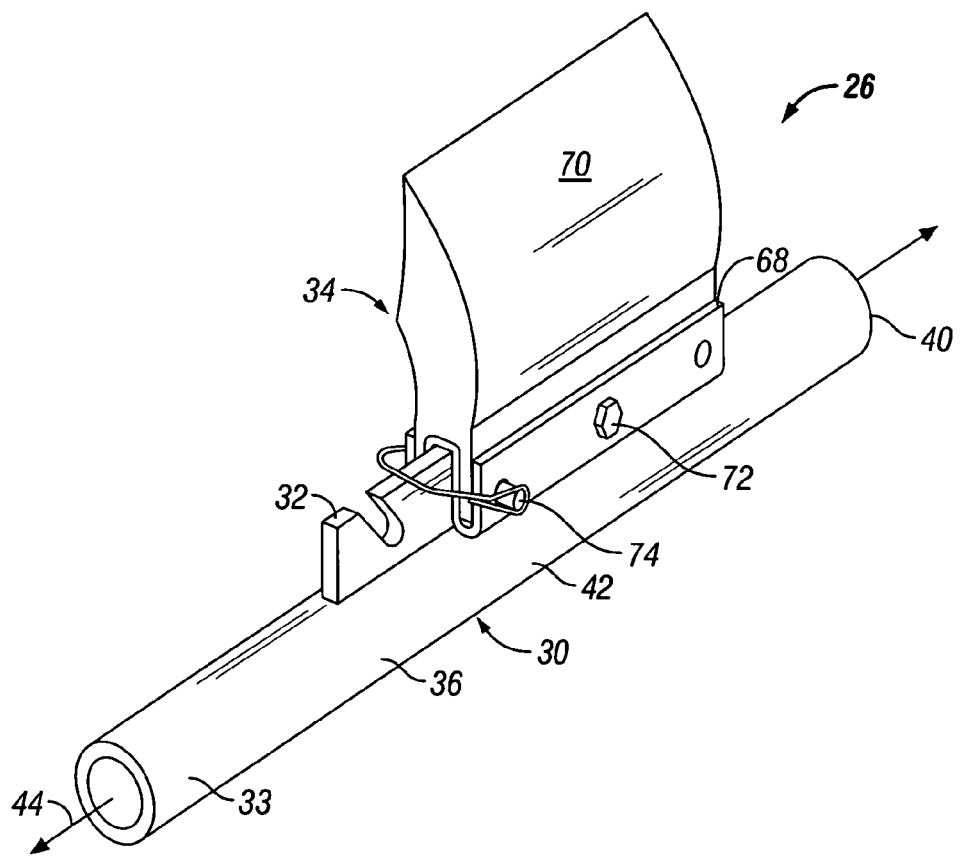
FIG. 15 shows a perspective view of the conveyor belt cleaner in accordance with a preferred embodiment of the present invention.

As shown in FIGS. 14 and 15, the conveyor belt cleaner 26 of the present invention comprises a support frame 30, mounting bar 32, and one or more full face contact scraper blade assemblies 34 comprising a blade support 68 and scraper blade 70. The support frame 30 consists of a cross shaft 36 having a first end 38, a second end 40, a central portion 42, and a longitudinal support frame axis of rotation 44 extending from the first end 36 through the second end 40. The first and second ends 38, 40 are adapted to fix the conveyor belt cleaner 26 in close proximity to the conveyor belt 12 either by the first and second ends 38, 40 extending through bores 23 (FIG. 3) in the conveyor chute walls 20, 22 and being received by bearing brackets 42 (FIGS. 1 and 2), described in detail below, or by the first and second ends 38, 40 being received by a stationery structure (not shown) adapted to secure the support frame 30 in position.

A mounting member comprising a bearing bracket 42, as is shown in FIGS. 7, 9 and 10, is adapted to be connected to the first end 38 of the support frame 30 to secure the support frame 30 in position. A second bearing bracket (not shown) is located on the opposite chute wall 22 to receive and secure in place the second end 40. The bearing bracket 42 includes a base plate 44 having a plurality of apertures 46 corresponding to a plurality of apertures 47 (FIG. 3) in the conveyor chute wall 20 for affixing the bearing bracket 42 to the conveyor chute wall 20, or other stationary structure, with screws, pins or other like fasteners. A hub 48 extends from the front surface of the base plate 44 and includes a bore 50 that extends through the hub 48 and base plate 44 to form a central channel 52 through the bearing bracket 42. The channel 52 is adapted to receive an end 38 or 40 of the support frame 30. An aperture comprising an internally threaded bore 54 extends through the wall of the hub 48 and is configured to receive a set screw 56 to facilitate securing of the support frame 30 within the central channel 52.

Mounted within the hub 48 is a rotatable bearing 58 having an inside diameter adapted to receive the end 38 or 40 of the support frame 30 and progressively decreasing outside diameters creating a curved exterior surface 60 (FIG. 8) with respect to the central axis of the bearing 58. In this manner, the bearing 58 has the geometry of a plain spherical bearing. The curved exterior surface 60 of the bearing 58 enables it to freely rotate within the central channel 52 of the bearing bracket 42. Upon manipulation of the bearing 58 into the desired position, the bearing 58 is secured into place with the set screw 56 in the hub 48. The bearing 58 may be composed of nylon, urethane, hardened rubber, plastic or any other suitable material that will enable the set screw 56 to securely hold the bearing 58 in place. Use of a polymer or plastic material in the bearing also aids in shock absorption and noise reduction.

The multi-position, rotatable bearing 58 enables the bearing bracket 42 to be fastened to a chute wall 20 or other stationary structure to form an angle (the mounting angle) other than 90° with the support frame 30. The mounting angle is limited by the interior diameter of the hub 48 and the length of the hub 48. Preferably the mounting angle of the bearing bracket 42 to the chute wall 20 is 90°±5°.

Figure 3:
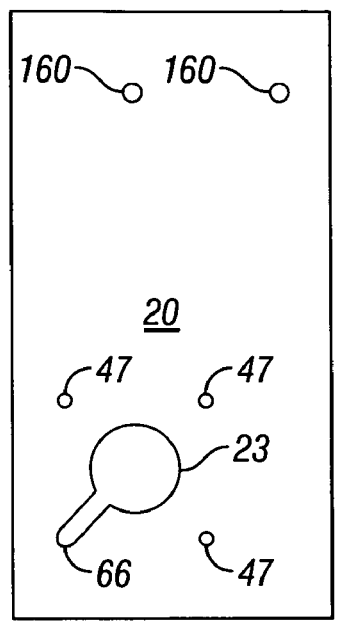
FIG. 3 shows a side elevation view of a chute wall associated with the conveyor belt cleaner and tensioner in accordance with a preferred embodiment of the present invention.
Figure 6:
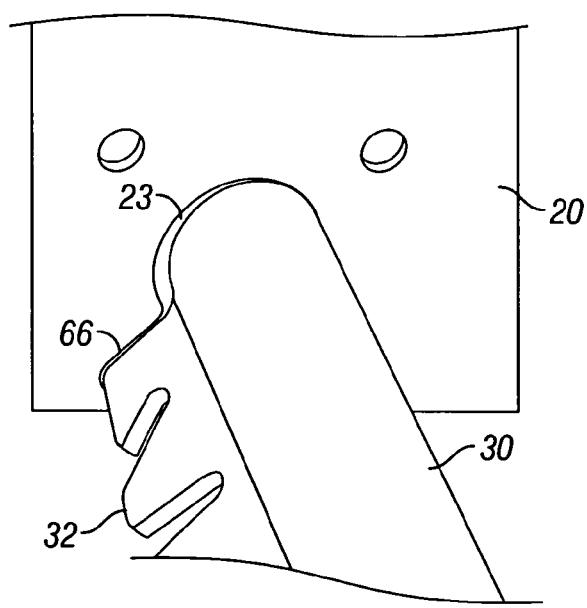
FIG. 6 shows a third perspective view of components of the conveyor belt cleaner and tensioner in accordance with a preferred embodiment of the present invention.

Referring back to FIGS. 14 and 15, a mounting bar 32 adapted to receive the blade assembly 34 is mounted to the central portion 42 of the support frame 30 by any suitable means. Preferably the mounting bar 32 is secured to the support frame 30 by welding. However, it is contemplated that other means, including glue, other adhesives or clamps may be used to secure the mounting bar 32 to the support frame 30. As seen in FIGS. 3 and 6, at least one of the chute wall bores 23 further comprises a rectangular keyway 66 in communication with the bore 23. The keyway 66 is configured to accommodate the size of the mounting bar 32 to enable the support frame 30—mounting bar 32 assembly to insert through the chute wall 20 and into the conveyor chamber 24 (FIGS. 1 and 2).

Figure 22:
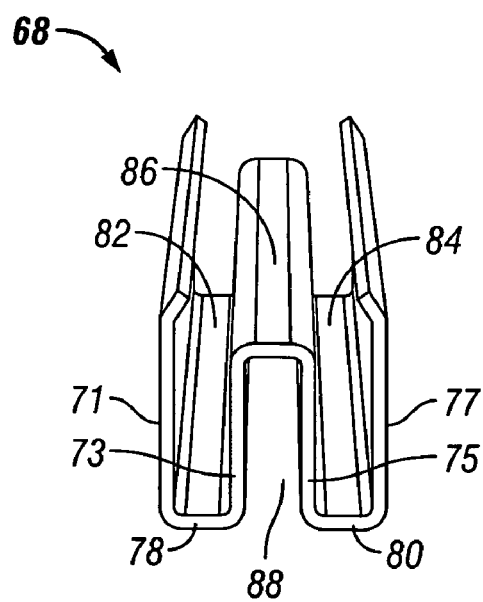
FIGS. 22 and 23 are perspective views of a component of the conveyor belt cleaner in accordance with a preferred embodiment of the present invention.
Figure 23:
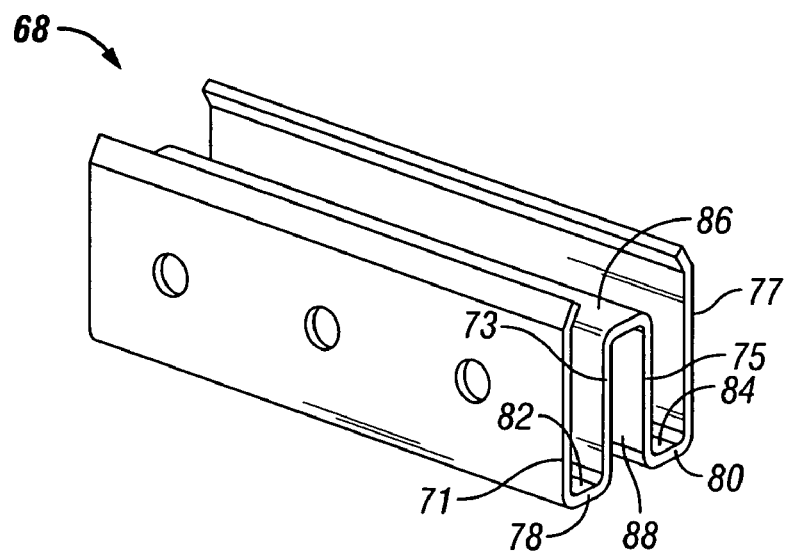

A blade assembly 34, comprising a blade support 68 and scraper blade 70, is removably attached to the mounting bar 32. A shoulder bolt 72 and lynch pin 74 secure the blade assembly 34 to the mounting bar 32. As is seen in FIGS. 22 and 23, the blade support 68 is a substantially W-shaped member preferably formed from 14 gauge or 2 mm thick galvanized steel or stainless steel. The blade support comprises a first, second, third, and fourth sidewall 71, 73, 75, 77. The first and second sidewall 71, 73 and third and fourth 75, 77 sidewall are connected by web portions 78, 80 at the lower edge of each sidewall forming a first and second upwardly opening outer channel 82, 84. The second and third sidewalls 73, 75 are connected by a web portion 86 at the upper edge of each sidewall, forming a downwardly opening central channel 88. The central channel 88 is configured to receive the mounting bar 32 (FIGS. 14 and 15) in a tongue and groove or telescoping arrangement.

Figure 24A:
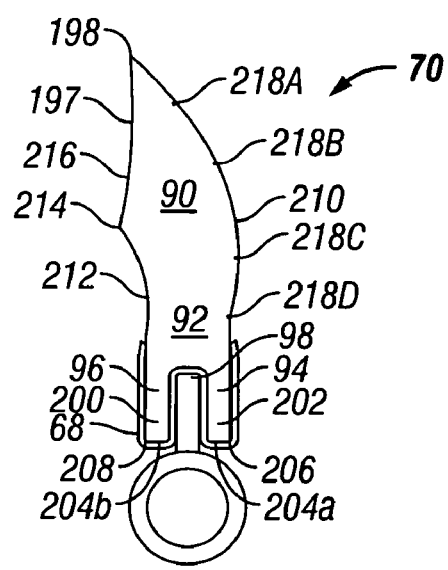
FIGS. 24a and 24b are elevation views of a component of the conveyor belt cleaner in accordance with a preferred embodiment of the present invention.
Figure 24B:
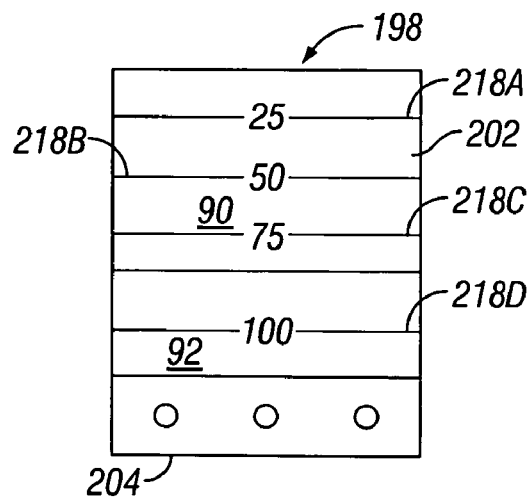

The scraper blade 70, as best seen in FIGS. 24a and 24b, includes a scraper portion 90 that extends outwardly from a base portion 92 to a scraping tip 197. The base portion 90 comprises a first and second leg portion 94, 96 and a central channel 98, mirroring the profile of the blade support 68 for removable attachment to the blade support 68. The scraper portion 90 and base portion 92 extend between a generally planar left sidewall surface 200 and a generally planar right sidewall surface 202. The base portion 92 includes a generally planar basewall 204a, 204b having a front edge 206 on the first leg portion 94 and a rear edge 208 on the second leg portion 96. The scraper portion 90 and base portion 92 are primarily formed from an elastomeric material such as urethane or rubber.

The scraping tip 197 of the scraper blade 70 includes a generally linear scraping edge 198. The scraper blade 70 further includes a front surface 210 extending from the front edge 206 to the scraping edge 198, forming a distal edge of the front surface 210 and a rear surface 212 that extends from the rear edge 208 to a distal edge 214. A blade face surface 216 extends between the distal scraping edge 198 and the distal edge 214. The blade face surface 216 is curved to conform to the curvature of the conveyor belt 12 (1, 2 and 21) such that the entire blade face surface 216 will engage the belt in full-face contact.

The portion of the front surface 210 that extends along the scraper portion 90, is preferably formed to have a configuration that provides a substantially constant cleaning angle between the front surface 210 at the scraping edge 198 as the scraper portion 90 wears down during use and the scraper blade 70 is radially adjusted along the longitudinal axis 44 (FIGS. 14 and 15) to remain in full face scraping engagement with the conveyor belt. A configuration for the front surface that provides a substantially constant cleaning angle is disclosed in U.S. Pat. No. 4,917,231 of Martin Engineering Company and U.S. Pat. No. 6,439,373 also of Martin Engineering Company. Both of which are incorporated herein by reference.

The scraper portion 90 also includes a plurality of elongated ridges 218A–D which extends across the front surface 210. The ridges 218A–D respectively indicate when the scraper portion 90 has been worn down such that 25%, 50%, 75% and 100% of the total wear volume of the scraper portion 90 has been worn away. The ridges 218A–D may also be formed as grooves.

Referring to FIGS. 1, 5, 11–13 and 19, the conveyor belt cleaner tensioner 28 includes a mounting member such as pulley 114. The pulley 114 has a generally circular peripheral edge 116 including a circular groove 117 and at least one internally-threaded bore 118 for receiving a set screw 120. A central bore 122 (FIGS. 19 and 20) extends from the front surface to the rear surface of the pulley 114. The central bore 122 is sized such that the first end 28 of the support frame 30 fits closely within the bore 122. Tightening of the set screw 120 couples the pulley 114 and support frame 30 together for conjoint rotation. The pulley 114 also includes a transverse channel 124 on the periphery of the pulley 114, the channel having a substantially C-shaped cross-section and defined by a channel wall portion 126 and a first and second inwardly facing lip portion 128, 130. The intersection of the groove 117 and transverse channel 124 forms a socket 132 adapted to securely receive the first end 134 (FIG. 18) of a connector 136, preferably an elongate flexible cable.

Figure 18:
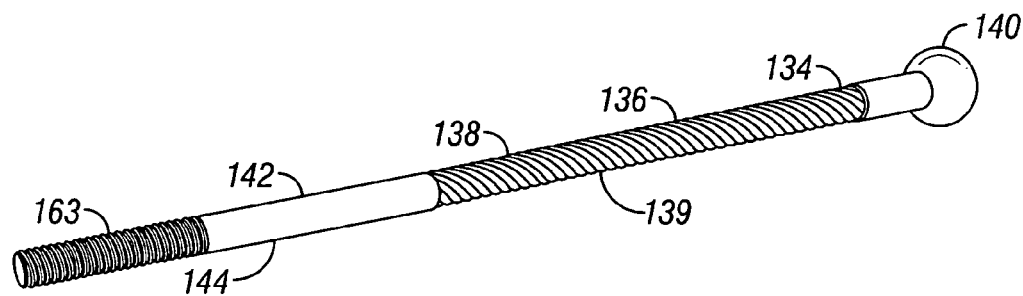
FIG. 18 shows a perspective view of a component of the tensioner in accordance with a preferred embodiment of the present invention.
Figure 19:
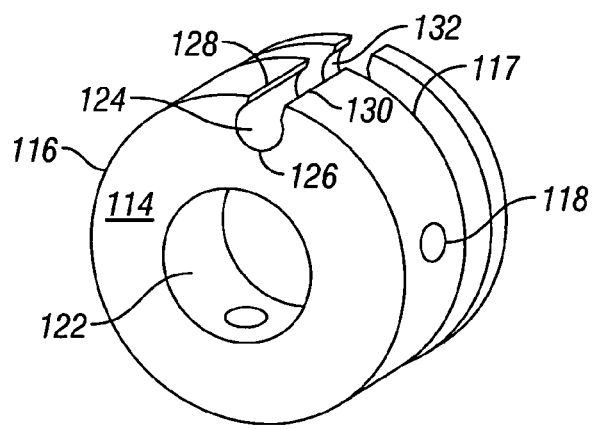
FIG. 19 shows a perspective view of a component of the tensioner in accordance with a preferred embodiment of the present invention.
Figure 20:
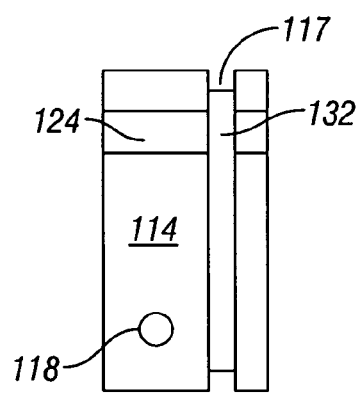
FIG. 20 shows a side elevation view of a component of the tensioner in accordance with a preferred embodiment of the present invention.

The cable 136 (FIG. 18) may be made from wire rope, chain, nylon rope and other types of materials that provide sufficient flexibility and tensile strength. The cable 136 includes a first end and a second end 134, 138 and a central portion 139 there between. The first end 134 of the cable 136 includes an enlarged, bulbous stop member 140 configured to insert within and be retained by the socket 132 (FIGS. 19, 20). The second end 138 of the cable 136 mates with the first, channeled end 142 of an elongate tensioner shaft 144.

Referring to FIGS. 1, 2, 5 and 16, the tensioner 28 includes a biasing member, such as a coil spring 146 having a first and second end 148, 150. The first end 148 of the spring 146 sits on the horizontal, landing portion 152 of an L-shaped bracket 154 (FIGS. 16 and 17) mounted to the conveyor chute wall 20 or another stationery structure. Apertures 156 in the vertical, mounting portion 158 of the bracket correspond to apertures 160 (FIG. 3) on the chute wall 20 to facilitate mounting of the bracket 154 to the chute wall 20 by any suitable means, such as screws or rivets. An annular compression disc 162 located at the second end 150 of the spring 146 enables even distribution of the tensile force exhibited by the spring 146 during operation of the tensioner. In this arrangement, the second end 150 of the spring 146 is movable with respect to the first end 148 along a central axis extending through the center of the spring 146.

Figure 16:
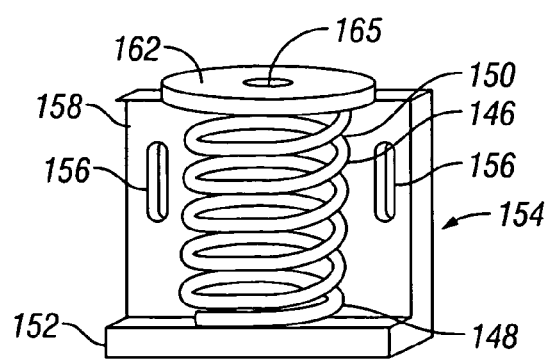
FIG. 16 shows a perspective view of assembled components of the conveyor belt cleaner and tensioner in accordance with a preferred embodiment of the present invention.
Figure 17:
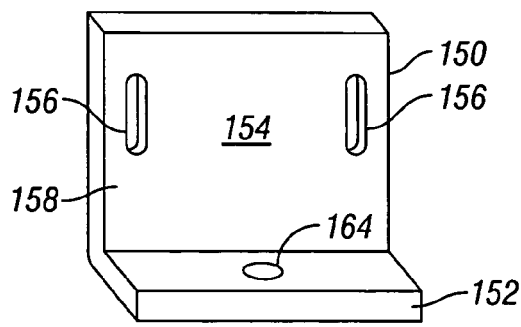
FIG. 17 shows a perspective view of a component of the tensioner in accordance with a preferred embodiment of the present invention.
Figure 25:
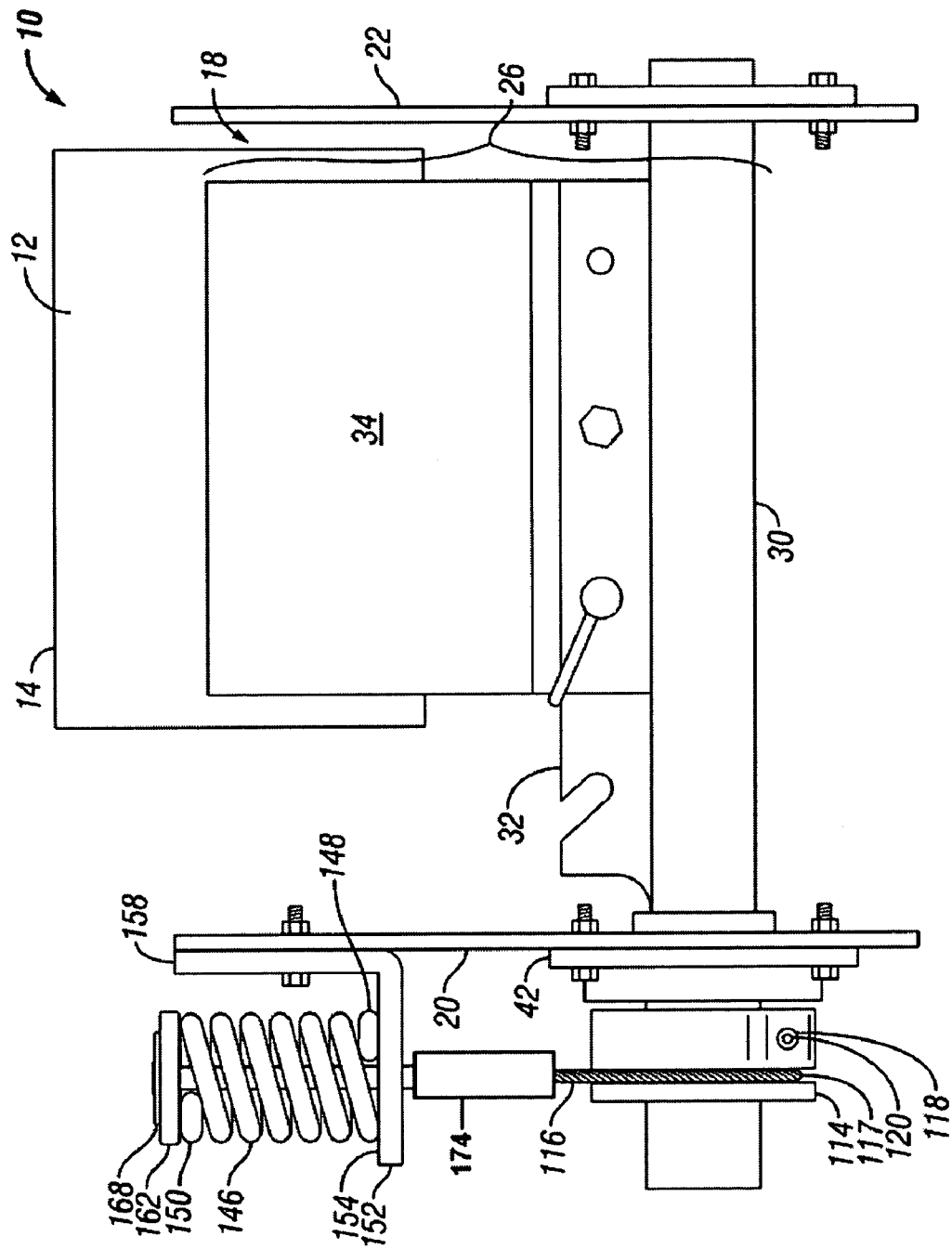
FIG. 25 shows a front elevation view of a conveyor belt cleaner and tensioner in accordance with a preferred embodiment of the present invention.
Figure 26:
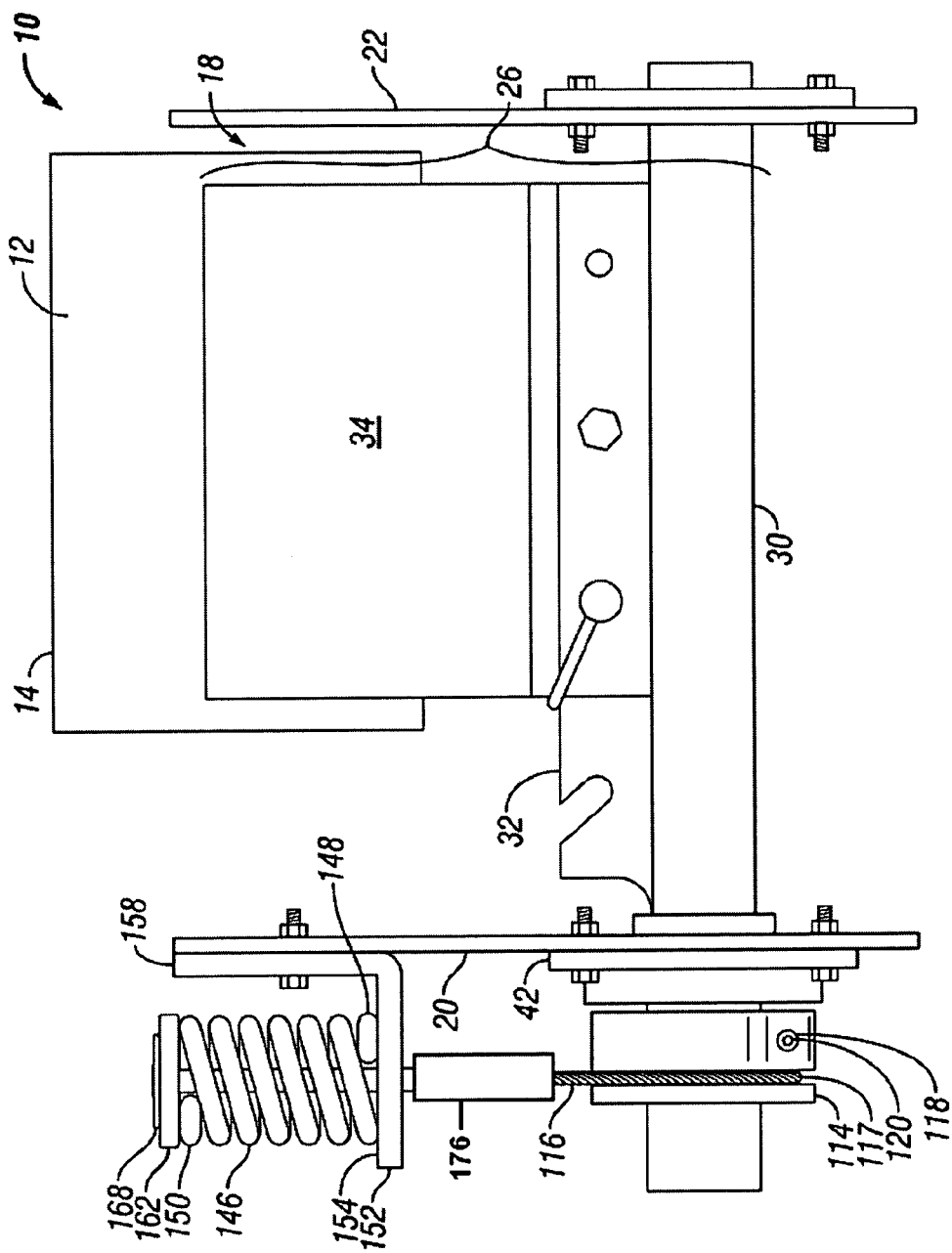
FIG. 26 shows a front elevation view of a conveyor belt cleaner and tensioner in accordance with a preferred embodiment of the present invention.

The externally-threaded, second end 163 (FIG. 18) of the elongate tensioner shaft 144 extends through an aperture 164 (FIG. 17) in the landing portion 152 of the bracket 154, through the center of the spring 146 and extends through the compression disc 162 at the disc aperture 165 (FIG. 16). An actuator member 166 mounts on the second, externally-threaded end 163 of the elongate shaft 144. In a preferred embodiment, the actuator member 166 comprises a washer 168, adjustment nut 170 and locking nut 172 positioned in a "double nutting" arrangement. Alternatively, the actuator member may comprise a turnbuckle 174 (FIG. 25) or toggle mechanism 176 (FIG. 26) interposed between the first end of the biasing member 148 and the second end 138 of the cable 136 (FIG. 18).

Figure 4:
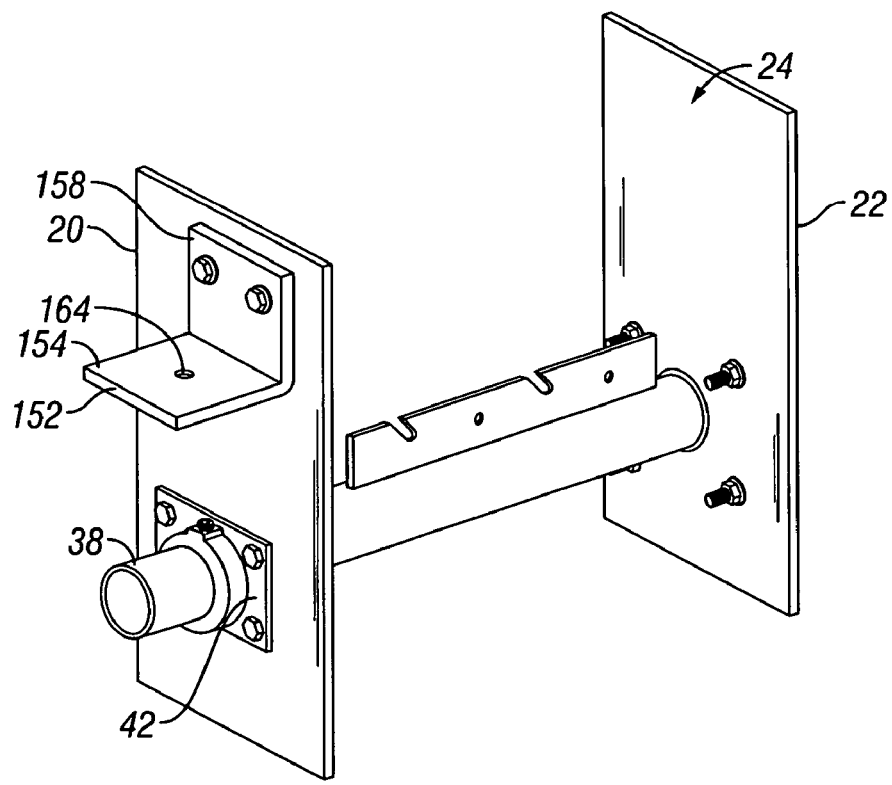
FIG. 4 shows a first perspective view of components of the conveyor belt cleaner and tensioner in accordance with a preferred embodiment of the present invention.

Referring back to FIGS. 1 and 2, in operation, the support frame 30—mounting bar 32 assembly is fabricated and inserted through the chute wall 20 (FIGS. 3 and 6) associated with the keyway 66. The first and second ends 38, 40 of the support frame 30 come to rest outside of the conveyor chamber 24 (FIG. 1), and the central portion 42 of the support frame 30, with the affixed mounting bar 32, comes to rest within the chamber 24. As is seen in FIG. 4, the bearing bracket 42 is inserted over the first end 38 of the support frame 30 and mounted to the chute wall 20 in a position enabling coaxial alignment of the central channel 52 in the bearing bracket 42 and the chute wall bore 23 (FIGS. 3 and 6).

Once the bearing bracket 42 is mounted, the set screw 56 in the hub 54 (FIGS. 9 and 10) may be tightened to secure the bearing 58 and support frame 30 together and to hold the support frame 30 in a maintenance position. Releasing the set screw 56 and disengaging it from secure contact with the bearing 58 enables the support frame 30 to rotate freely with the bearing 58.

A second bearing bracket (not shown) may be inserted over the second end 40 of the support frame 30 and mounted on the opposite chute wall 22. Alternatively, any mounting member with a central channel adapted to securely receive the second of the support frame 30 may be utilized.

In the single tensioner embodiment described herein, the tensioner assembly 28 prevents excess lateral movement of the support frame 30 along its longitudinal axis and away from the chute wall 20. Continued lateral movement of the support frame 30 towards the opposing chute wall 22 is restricted by the tensioner 28 coming into contact with the bearing bracket 42.

At the non-tensioner end, a set collar (not shown) is supplied to prevent excess lateral movement of the second end 40 of the support frame 30 towards the opposite chute wall 20. The set collar has an inner diameter that is slightly larger than the outer diameter of the support frame 30. Preferably, the outer diameter is approximately 76.2 mm (3 inches) and the width of the set collar is 22.2 mm (⅞ inch). A 12.7 mm (½ inch) set screw extending through the periphery the set collar engages the support frame and locks the support frame and set collar enabling conjoint rotation and lateral movement. Lateral movement of the support frame 30 towards the opposing chute wall 20 is restricted by the set collar coming into contact with the bearing bracket on the chute wall 22.

One or more blade assemblies 34 are removably fastened to the mounting bar 32 by fasteners extending through the aligned through holes in the blade assembly 34 and mounting bar 32, as previously described above in connection with FIGS. 14 and 15. The blade assembly or assemblies 34 are thereby selectively removable and replaceable on the support frame 30.

Figure 5:
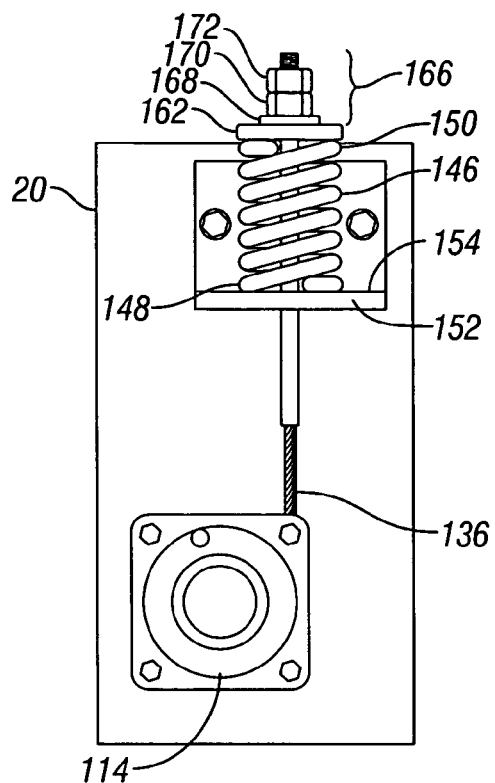
FIG. 5 shows a side elevation view of components of the conveyor belt cleaner and tensioner in accordance with a preferred embodiment of the present invention.

Referring to FIGS. 1, 2 and 5, a conveyor belt cleaner tensioner 28 is attached to the first end 38 of the support frame 30 extending through the bearing bracket 42. The pulley 114 is slid over the first end 38 of the support frame 30 which extends through the central channel 52 of the bearing bracket 42. The central bore 122 (FIG. 19) of the pulley 114 receives the first 38 end of the support frame 30. A set screw 120 (FIG. 12) is inserted within the bore 118 (FIG. 12) on the periphery of the pulley 114 and is tightened to couple the pulley 114 and support frame 30 for conjoint rotation.

Figure 11:
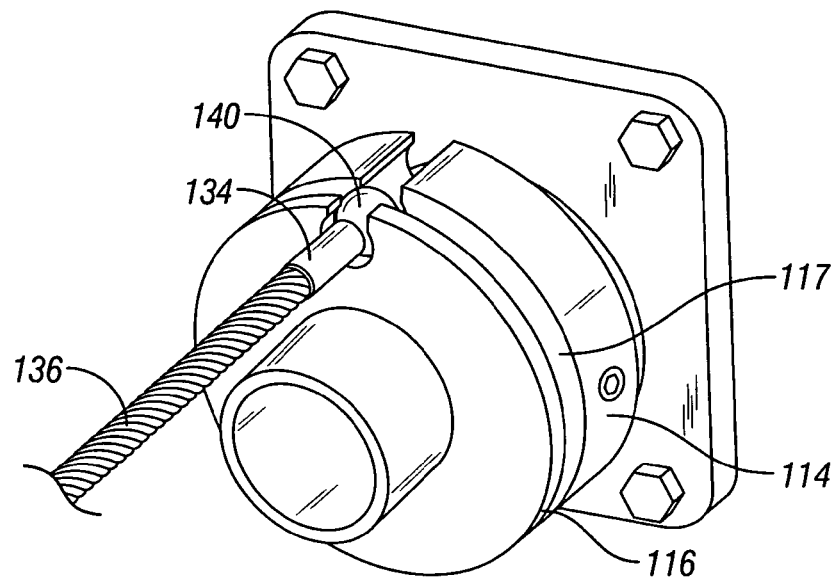
FIG. 11 shows a perspective view of assembled components of the conveyor belt cleaner and tensioner in accordance with a preferred embodiment of the present invention.
Figure 12:
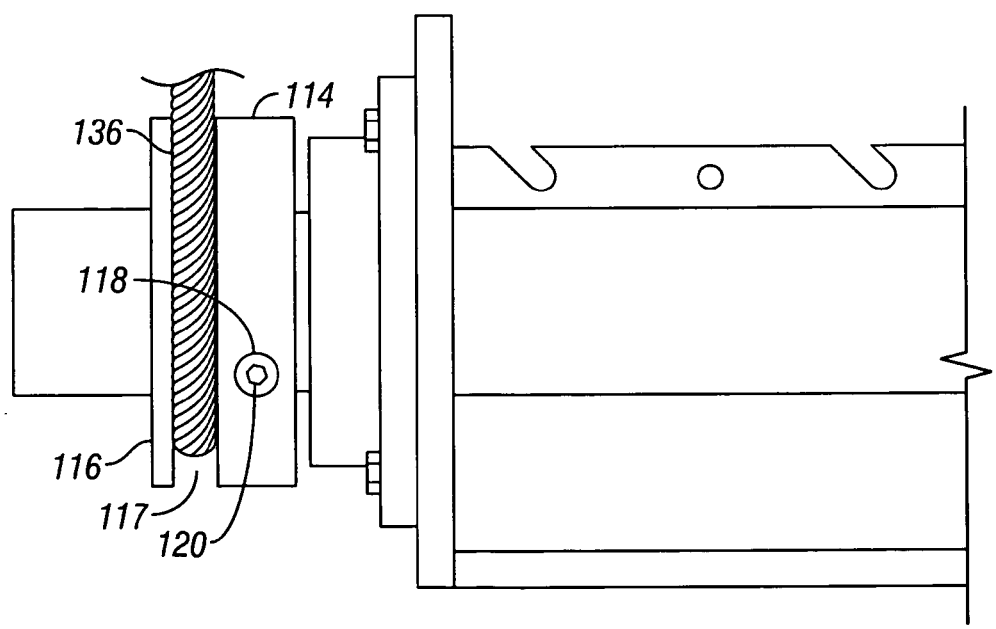
FIG. 12 shows a front elevation view of assembled components of the conveyor belt cleaner and tensioner in accordance with a preferred embodiment of the present invention.
Figure 13:
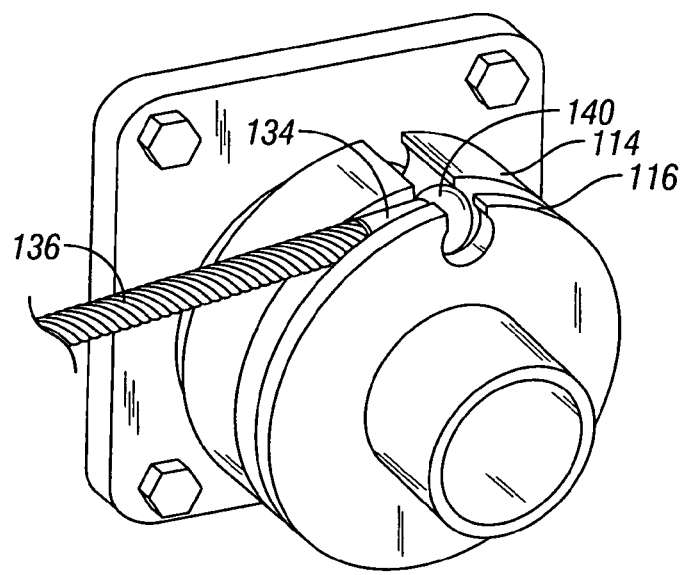
FIG. 13 shows a perspective view of assembled components of the conveyor belt cleaner and tensioner in accordance with a preferred embodiment of the present invention.

Referring to FIGS. 11–13, the cable 136 is inserted within the groove 117 around the periphery of the pulley 114 by first aligning the stop member 140 at the first end 134 of the cable 136 with an end of the transverse channel 124 and aligning the cable 136 in a position extending radially away from the center of the pulley 114. The cable 136 is then slid into position within the groove 117 by sliding the stop member 140 within the transverse channel 124 with the cable 136 traveling within the opening at the top of the channel. When the stop member 140 is received by the socket 132, the cable 136 is laid within the peripheral pulley groove 117.

The second end 138 of the cable 136 mates the channeled, first end 142 of the tensioner shaft 144. The threaded, second end 163 of the shaft 144 extends upwards from the pulley 114, through the aperture 164 (FIG. 17) in the bottom of the L-bracket 154, previously mounted to the chute wall or other stationary support. The spring 146 is seated with the first end 148 on the landing 152 of the L-bracket 154 and with the shaft 144 extending though the interior of the spring 146. The threaded, second end 163 of the shaft 144 extends through the aperture 165 (FIG. 16) in compression disc 162 atop the second end 150 of the spring 146. Inclusion of the compression disc 162 enables the shaft 144 and spring 146 to align coaxially.

The tensioner actuator 166 mates with the threaded, second end 163 of the shaft 144 extending above the compression disc 162. Tension is applied to the shaft 144 and cable 136 by tightening the adjustment nut 170 to compress the spring 146 and securing the adjustment nut 170 in position by tightening the locking nut 172 until it abuts the adjustment nut 170. As is shown in FIGS. 1, 2 and 5, the spring 146 and actuator 166 extend generally coaxially with one another and are disposed in a generally vertical orientation. However, if desired, the spring 146 and actuator 166 may be positioned in a generally horizontal orientation or at any other angle in between.

Referring to FIGS. 1, 14, 15, 24 and 25, initially the support frame 30 and blade assembly 34 of the conveyor belt 12 cleaner are located such that the blade face surface 216 of the scraper blade 70 is in full-face contact or engagement with the outer surface 14 of the conveyor belt 12. The actuator 166 may then be selectively rotated with respect to the tensioner shaft 136 such that the spring 146 will become compressed between the annular compression disc 162 and landing 152 of the L-bracket 154 creating a stored biasing force within the compressed spring 146. The spring 146 applies a tensile biasing force to the tensioner shaft 144 and cable 136 which in turn applies a rotational biasing force to the pulley 114 and to the support frame 30.

As the scraper portion 90 wears down through scraping engagement with the rotating conveyor belt, the distal edge 198 of the front surface 210 becomes relocated along the front surface 210. The scraping angle defined between a first line passing through the distal edge 198 of the front surface 210 that is tangential to the conveyor belt 12 and a second line extending through the distal edge 214 that is generally tangential to the front surface 210 will remain substantially constant as the scraper blade wears down and is rotated about the axis 44 into continuing full-face contact with the conveyor belt 12 due to the configuration of the front surface 210.

As the distal scraping edge 110 of the front surface 104 of the scraper blade 70, the distal edge 112 of the rear surface 106, and the scraping tip 100 wears down through scraping engagement with the rotating conveyor belt 12, the compressed spring 146 will expand or elongate. The spring 146 will rotate the pulley 114 and the support frame 30 about the longitudinal axis 44 to maintain the newly formed distal edges 110, 112 and blade face surface 108 of the worn scraper blade 70 in biased, full-face scraping engagement with the conveyor belt 12. The spring is adapted to rotate the support frame 30 and the scraper blade 70 through a selected angle about the longitudinal axis 44 over the wear life of the scraper blade 70.

The tip surface 197 of the scraper portion 90 has a width that extends between the left sidewall surface 200 and the right sidewall surface 202. The blade face surface 216 also has a height that extends between the distal edge 214 of the rear surface 212 and the distal edge or scraping tip 198 of the front surface 210. Therefore the blade face surface 216 therefore has a surface area defined by the width and height of the blade face surface 216. The spring 146 applies a rotational biasing force to the pulley 114 and to the support frame 30 which rotates the blade face surface 197 into full-face engagement with the conveyor belt 12 with a scraping force that is generally normal to the surface of the conveyor belt 12. The blade face surface 216 is thereby pressed against the surface of the conveyor belt 12 with a scraping pressure that is equal to the scraping force divided by the area of the blade face surface that is engaging the surface of the conveyor belt 12.

To maintain efficient cleaning of the conveyor belt 12, the scraping pressure with which the blade face surface 216 engages the conveyor belt should remain generally constant through the wear life of the scraper blade 70. The portion of the rear surface 212 that extends along the scraper portion 90 is configured and located with respect to the portion of the front surface 210 that extends along the scraper portion 90 such that the average scraping pressure between the blade face surface 216 and the conveyor belt 12 remains substantially constant over the wear life of the scraper portion 90 as the scraping tip 198 of the scraper portion 90 wears down toward the base portion 92.

Figure 21:
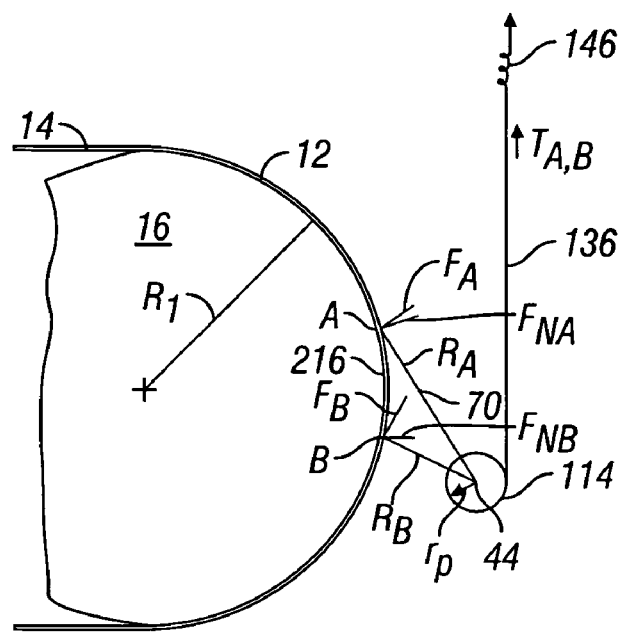
FIG. 21 is a diagram illustrating the operation of a conveyor belt cleaner and tensioner in accordance with a preferred embodiment of the present invention.

As illustrated in FIG. 21, when the center of the blade face surface 216 of the scraper portion 90 engages the outer surface 14 of the conveyor belt 12 at position "A," the tensile biasing force ($T_A$) applied by the spring 146 to the cable 136 and to pulley 114 is equal to the spring constant of the spring 146 (which may be in pounds per inch) multiplied by the distance the spring is compressed by the actuator (not shown). This tensile biasing force $T_A$ creates a moment ($M_{44}$) about the longitudinal axis 44 that is equal to the tensile biasing force $T_A$ multiplied by the radius ($r_p$) from the longitudinal axis 44 to the center line of the cable located within the groove (not shown) of the pulley 114. The moment $M_{44}$ created about the longitudinal axis 44 by the spring 146 is resisted by an equal and opposite moment equal to the length of a radius ($R_A$) extending from the longitudinal axis 44 to the center of the blade face surface 216 multiplied by a force ($F_A$) that is generally perpendicular to the radius $R_A$. Radius $R_A$ is calculated by calculating the arc angle of the blade face surface 216 and then dividing the arc angle by two to determine the point where the average radius of the scraper 70 contacts the belt surface 14. This radius is used as the blade contact surface lever arm.

Force $F_{NA}$ is the component of the force $F_A$ that is normal to the surface 14 of the conveyor belt 12. Force ($F_{NA}$) is divided by the area of the blade face surface 216 to obtain the scraping pressure with which the tip surface 216 engages the conveyor belt 12. Radius $R_A$ is calculated for every 5° of wear of the scraper blade 70. This enables calculation of an appropriate spring constant to maintain a constant scraping pressure throughout the wear life of the scraper blade 70. Through an iterative process the contact areas, lever arms and spring constants are selected which result in a constant cleaning pressure over the wear life of the scraper blade 70, to the extent practical. One embodiment uses a nine inch radius as an eighteen inch diameter pulley diameter is among the larger diameters to be used in such common applications. By basing the design on the maximum radius, the contact for smaller diameters will initially be a point of contact at $R_A$. The contact will quickly become full surface as the blade wears and adapts to smaller diameters.

Another embodiment would use a radius of twelve inches to allow for larger diameter pulleys and corresponding belt surface diameters. Likewise the radius used for designing the blade geometry could start at any diameter depending on the application.

As the scraper portion 90 wears down toward the mounting base 92, the spring 146 will elongate to rotate the scraper portion 90 into continuing engagement with the conveyor belt 12 and the blade face surface 216 will move from position A as shown in FIG. 21 to position B. As the spring 146 elongates, it will provide a tensile force $T_B$ to the cable 136 and the pulley 114 that is smaller than the tensile force $T_A$. The tensile force $T_B$ will create a smaller moment about the longitudinal axis 44 than the tensile force $T_A$ as the radius $R_P$ of the pulley 114 remains constant. In addition, as the scraper portion 90 wears down, the length of the radius $R_B$ from the longitudinal axis 44 to the center of the blade face surface 216 at position B will be shorter than the radius $R_A$. The angle at which each radius $R_A$ and $R_B$ is located with respect to the curved surface of the conveyor belt 12 also changes as the scraper portion 90 moves from position A to B. This results in a change in the force $F_{NB}$ that is normal to the surface of the conveyor belt 12 that resists the biasing force created by the spring 146 at position B from the force $F_{NA}$ at position A.

As the scraping force $F_{NB}$ has changed from the scraping force $F_{NA}$, the area of the blade face surface 216 must accordingly change to maintain a constant scraping pressure. As the width of the blade face surface 216 remains substantially constant as the scraper portion 90 wears down, the height of the blade face surface 216 between the distal edge 198 of the front surface 210 and the distal edge 214 of the rear surface 212 (which generally corresponds to the thickness of the scraper blade) must change as the scraper portion 90 wears down to maintain a substantially constant full-face scraping pressure between the blade face surface 216 and the conveyor belt 12.

The shape of the front surface 210 and of the rear surface 212 of the scraper portion 90 are respectively configured and located with respect to one another such that a substantially constant scraping pressure will be maintained between the blade face surface 216 and the surface 14 of the conveyor belt 12 as the scraper portion 90 wears down and is rotated into continuing full face engagement with the conveyor belt 12 by the spring 146. The scraper portion 90 provides a substantially constant cleaning angle between the front surface 210 and the conveyor belt 12, and provides a substantially constant scraping pressure between the blade face surface 216 and the conveyor belt 12, as the scraper portion 90 wears down during use with conveyor belt 12 having a radius $R_1$ of approximately 225 mm (9 inches) or less. Although a preferred embodiment of the present invention has been described with a conveyor belt 12 having a radius $R_1$ of approximately 225 mm (9 inches) or less, it is contemplated that as described in U.S. Pat. No. 4,917,231 of Martin Engineering Company and U.S. Pat. No. 6,439,373 also of Martin Engineering Company, both patents of which are incorporated herein by, when the conveyor belt head pulley 16 has a radius $R_1$ ranges of approximately 600 to 1200 mm (12 to 24 inches) and 1200 mm (24 inches) or larger, the same principles apply.

A preferred scraping pressure is approximately 19 Kpa (2.75 pounds per square inch). As used herein, a substantially constant scraping pressure may deviate up to plus or minus fifteen percent from the average scraping pressure over the wear life of the scraper portion 90, and a substantially constant scraping angle may deviate up to plus or minus fifteen percent from the initial scraping angle. The initial scraping angle is preferably within the range of approximately 25° to 60° with a preferred angle of 40°. The configuration of the front surface 210 is an involute curve. The rear surface 212 is determined by the contact area needed to maintain substantially constant cleaning pressure. To accommodate manufacturing of the molds a tolerance of the curved surfaces of plus or minus one-quarter (0.25) inch, and preferably plus or minus one tenth (0.1) inch, of the true path is desired. These tolerances still enable a substantially constant cleaning angle and a substantially constant full-face scraping pressure to be maintained in practice.

The radius $R_p$ of the pulley 114 is substantial similar to the radius of the support frame 30, and is preferably only slightly larger than the outer radius of the support frame 30. The small pulley radius design enables the scraper blade 70 to be design for full wear across 45° of rotation between a first position where the unworn, unused scraper blade 70 communicates with the conveyor belt 12 and a second position where the worn, used scraper blade 70 communicates with the conveyor belt 12.

Additionally, by keeping the pulley radius $R_p$ small, 45° of rotation requires less linear travel of the actuator 166 and translates into less compression of the spring 146. In the present inventive tensioner, 45° of rotation in the pulley 114 results from application of a rotational biasing force to the pulley 114 that is derived the linear biasing force generated by compression of the spring 146. The spring 146 must be preloaded with an actuator generated force equal to biasing force required when the scraper blade 70 is 100% worn. In this embodiment the preload distance is approximately 10 mm (0.39 inches) from the resting position of the spring. An additional compression of 25 mm (0.98 inches) is required to conjointly rotate the pulley and support frame between the first and second positions, resulting in a total spring travel of 35 mm (1.38 inches). In contrast, certain prior art tensioners require as much as 150 mm (5.9 inches) of total spring travel. Of the many beneficial aspects of the present inventive tensioner, its compact dimensions contribute to a small overall footprint. Additionally, the compactness of the tensioner leads to added safety since the movement of the tensioner is as little as approximately 35 mm (1.38 inches). In the event of a failure, there will be very little inertia stored in the connector 138.

Belt cleaner blades can be caught by obstructions on the belt or defects in the belt surface and pulled through in the direction of travel at the speed of the belt. With prior tensioner designs this may present a hazard to those inspecting or adjusting the belt cleaner. The present design is a safety improvement over prior designs in that there are no protruding fasteners or levers attached to the support shaft of the belt cleaner. The small diameter of the pulley mounted on the belt cleaner shaft reduces the distance the pulley will travel if the belt cleaner blades are pulled through. The flexible connection means between the pulley and the biasing spring reduces the chance of injury, when compared to a fixed lever arm, should the blade be pulled through.

Various features of the invention have been particularly shown and described in connection with the illustrated embodiments of the invention, however, it must be understood that these particular arrangements merely illustrate, and that the invention must be given its fullest interpretation within the terms of the appended claims.

I claim:

1. A tensioner for a conveyor belt cleaner including a rotatable support frame having a central axis and a scraper blade attached to the support frame for cleaning a conveyor belt, the tensioner comprising:

a first mounting member adapted to receive a first end of the support frame and to operatively attach the support frame to a stationery support, the first mounting member comprising a fixing element movable between a first position enabling the support frame to freely rotate about the central axis and a second position selectively securing the support frame in a position wherein the scraper blade is rotated away from the conveyor belt and prevented from rotating back into scraping engagement with the conveyor belt surface; and an actuator operatively attached to the support frame to apply a rotational biasing force to rotate the support frame and the scraper blade about the central axis.

2. The tensioner of claim 1 wherein the fixing element comprises a set screw.

3. A tensioner for a conveyor belt cleaner including a rotatable support frame having a central axis and a scraper blade attached to the support frame for cleaning a conveyor belt, the tensioner comprising:
a first mounting member adapted to receive a first end of the support frame and to operatively attach the support frame to a stationery support, the first mounting member comprising a fixing element movable between a first position configured to enable the scraper blade to communicate with the conveyor belt and a second position configured to secure the scraper blade in a position rotated away from the conveyor belt, the fixing element comprising a set screw and the first mounting member comprising a bearing bracket with a hub for receiving the first end of the support frame, wherein the hub comprises an aperture positioned transverse to the central axis for receiving the set screw;
a second mounting member adapted to be attached to the support frame for conjoint rotation with the support frame about the central axis; and
an actuator operatively attached to the second mounting member and configured to selectively apply a rotational biasing force to the second mounting member and thereby rotate the support frame and the scraper blade about the central axis.

4. The tensioner of claim 3 wherein the actuator comprises an adjustment nut and a locking nut mounted on a shaft operatively connected to the second mounting member.

5. The tensioner of claim 3 wherein the actuator comprises a turnbuckle operatively connected to the second mounting member.

6. The tensioner of claim 3 wherein the actuator comprises a toggle clamp operatively connected to the second mounting member.

7. The tensioner of claim 3 wherein the second mounting member comprises a pulley.

8. The tensioner of claim 3 further comprising a connector comprising a first end operatively associated with the actuator, a second end operatively associated with the second mounting member, and central portion there between.

9. The tensioner of claim 8 wherein the second mounting member comprises a socket adapted to releasably hold the second end of the connector and a groove adapted to releasably hold the central portion of the connector.

10. The tensioner of claim 8 wherein the connector comprises a wire rope.

11. The tensioner of claim 8 wherein the connector comprises a cable.

12. The tensioner of claim 3 further comprising a biasing member having a first end and a second end, the second end operatively connected to the actuator arid being movable with respect to the first end of the biasing member.

13. The tensioner of claim 12 wherein the biasing member is configured to store a biasing force generated by the actuator, and wherein the biasing member is further configured to release the biasing force to bias the scraper blade into continuing engagement with the conveyor during the wear life of the scraper blade without additional force being generated by the actuator.

14. The tensioner of claim 12 wherein the biasing member comprises a spring.

15. A tensioner for a conveyor belt cleaner including a rotatable support frame having a central axis and a scraper blade attached to the support frame for cleaning a conveyor belt, the tensioner comprising:
a mounting member adapted to be attached to the support frame for conjoint rotation with the support frame about the central axis, the mounting member comprising a circumferential groove extending around the periphery of the mounting member, and a socket disposed in the mounting member;
an actuator operatively attached to the first mounting member and configured to apply a rotational biasing force to the mounting member and thereby rotate the support frame and the scraper blade about the central axis; and
a connector comprising a first end operatively associated with the actuator, a second end operatively associated with the mounting member and con figured to releasably engage the socket and a central portion there between adapted to releasably engage the circumferential groove,
the socket configured to securely maintain the connector in communication with the mounting member when the connector is under tension, and to releasably retain the connector in communication with the mounting member when the connector is not under tension.

16. The tensioner of claim 15 further comprising a mounting bracket adapted to receive the support frame and operatively attach the support frame to a stationery support, the mounting bracket comprising a fixing element movable between a first position configured to enable the scraper blade to communicate with the conveyor belt and a second position configured to secure the blade assembly in a position rotated away from the conveyor belt.

17. The tensioner of claim 16 wherein the fixing element comprises a set screw.

18. A tensioner for a conveyor belt cleaner including a rotatable support frame having a central axis and a scraper blade attached to the support frame for cleaning a conveyor belt, the tensioner comprising:
a first mounting member adapted to receive the support frame and operatively attach the support frame to a stationary support, the first mounting member comprising a fixing element, comprising a set screw, the fixing element movable between a first position configured to enable the scraper blade to communicate with the conveyor belt and a second position configured to secure the blade assembly in a position rotated away from the conveyor belt;
a second mounting member adapted to be attached to the support frame for conjoint rotation with the support frame about the central axis, the second mounting member comprising a socket and groove integrally formed with the biasing member and disposed on the periphery of the second mounting member;
an actuator operatively attached to the second mounting member and configured to selectively apply a rotational biasing force to the biasing member and thereby rotate the support frame and the scraper blade about the central axis; and
a connector comprising a first end operatively associated with the actuator, a second end operatively associated with the mounting member and configured to releasably engage the socket, and a central portion there between adapted to releasably engage the groove;
wherein the first mounting member comprises a bearing bracket with a hub for receiving the first end of the support frame, wherein the hub comprises an aperture positioned transverse to the central axis for receiving the set screw.

19. The tensioner of claim 18 wherein the actuator comprises an adjustment nut and a locking nut mounted on a shaft operatively connected to the second mounting member.

20. The tensioner of claim 18 wherein the actuator comprises a turnbuckle operatively connected to the second mounting member.

21. The tensioner of claim 18 wherein the actuator comprises a toggle clamp operatively connected to the second mounting member.

22. The tensioner of claim 18 further comprising a biasing member having a first end and a second end operatively connected to the actuator, the second end of the biasing member being movable with respect to the first end of the biasing member.

23. The tensioner of claim 22 wherein the biasing member is configured to store a biasing force generated by the actuator, and wherein the biasing member is further configured to release the biasing force to bias the scraper blade into continuing engagement with the conveyor during the wear life of the scraper blade without additional force being generated by the actuator.

24. The tensioner of claim 23 wherein the biasing member comprises a spring.

25. The tensioner of claim 18 wherein the connector comprises a wire rope.

26. The tensioner of claim 18 wherein the connector comprises a cable.

27. A tensioner for a conveyor belt cleaner including a rotatable support frame having a width and a central axis and a scraper blade attached to the support frame for cleaning a conveyor belt, the tensioner comprising:

a mounting member adapted to be attached to the support frame for conjoint rotation with the support frame about the central axis; and an actuator operatively attached to the mounting member to selectively apply a rotational biasing force to the mounting member and thereby rotate the support frame and the scraper blade about the central axis, the mourning member sized to rotate approximately 45° from a first position where the scraper blade is unworn and in engagement with the conveyor belt to a second position where the scraper blade is fully worn and in engagement with the conveyor belt.

28. The tensioner of claim 27 wherein the rotational biasing force is derived from a linear biasing force generated by the actuator and stored in a biasing member operatively attached to the actuator.

29. The tensioner of claim 28 wherein the biasing member comprises a spring.

30. The tensioner of claim 29 wherein the spring is preloaded with an amount of force approximately equal to a sum of a biasing force required when the scraper blade is 100% worn plus an amount of force required to conjointly rotate the mounting member and support frame through approximately 45° of rotation.

31. The tensioner of claim 27 wherein the mounting member comprises a pulley.

* * * * *

UNITED STATES PATENT AND TRADEMARK OFFICE
CERTIFICATE OF CORRECTION

PATENT NO. : 7,216,756 B2 Page 1 of 1
APPLICATION NO. : 10/996843
DATED : May 15, 2007
INVENTOR(S) : Swinderman It is certified that error appears in the above-identified patent and that said Letters Patent is hereby corrected as shown below:

Column 13

Line 53, replace "arid" with --and--

Column 14

Line 14, replace "con figured" with --configured--

Signed and Sealed this

Twentieth Day of November, 2007

JON W. DUDAS
*Director of the United States Patent and Trademark Office*